(12) United States Patent
Futa, Jr. et al.

(10) Patent No.: US 10,807,701 B2
(45) Date of Patent: Oct. 20, 2020

(54) AIRCRAFT TURBOPROP ENGINE PROPELLER PITCH CONTROL SYSTEM INCLUDING A CONTROLLABLE FEATHER VALVE

(71) Applicant: HONEYWELL INTERNATIONAL INC., Morris Plains, NJ (US)

(72) Inventors: Paul W. Futa, Jr., North Liberty, IN (US); Hannah Amor, South Bend, IN (US); Gary A. Valencourt, Niles, MI (US); Christopher Douglas Eick, Phoenix, AZ (US); Donald Striker, Chandler, AZ (US); Kevin Baker, Tempe, AZ (US); Jonathan Seeley, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 56 days.

(21) Appl. No.: 16/271,276

(22) Filed: Feb. 8, 2019

(65) Prior Publication Data
US 2020/0255123 A1 Aug. 13, 2020

(51) Int. Cl.
| | |
|---|---|
| *B64C 11/38* | (2006.01) |
| *B64C 11/44* | (2006.01) |
| *F01D 7/00* | (2006.01) |
| *B64C 27/64* | (2006.01) |
| *B64C 11/40* | (2006.01) |
| *B64C 11/30* | (2006.01) |
| *B64C 11/42* | (2006.01) |

(52) U.S. Cl.
CPC ............ *B64C 11/385* (2013.01); *B64C 11/44* (2013.01); *F01D 7/00* (2013.01); *B64C 11/30* (2013.01); *B64C 11/38* (2013.01); *B64C 11/40* (2013.01); *B64C 11/42* (2013.01); *B64C 27/64* (2013.01)

(58) Field of Classification Search
CPC ....... B64C 11/30; B64C 11/38; B64C 11/385; B64C 11/40; B64C 11/42; B64C 11/44; B64C 27/64; F01D 7/00
USPC ........................................ 137/565.13, 565.15
See application file for complete search history.

(56) References Cited

U.S. PATENT DOCUMENTS

| | | | | |
|---|---|---|---|---|
| 2,320,195 | A | | 5/1943 | Rindfleisch |
| 2,801,701 | A | * | 8/1957 | Coar ..................... B64C 11/385 416/43 |
| 2,910,126 | A | * | 10/1959 | Jedrziewski ............ B64C 11/40 416/157 R |
| 2,919,752 | A | * | 1/1960 | Brandes .................. B64C 11/40 416/48 |

(Continued)

OTHER PUBLICATIONS

Negative Torque Sensing (NTS) System; Category: General (/index.php/Category:General), Content source: SKYbrary (/index.php/About_SKYbrary), Content control: SKYbrary (/index.php/About_SKYbrary).

*Primary Examiner* — Kenneth J Hansen
*Assistant Examiner* — Behnoush Haghighian
(74) *Attorney, Agent, or Firm* — Lorenz & Kopf, LLP

(57) ABSTRACT

A propeller pitch control system for a turboprop engine of an aircraft includes a negative torque sensor, a full feather control valve assembly, and a feather valve assembly. The feather valve assembly is responsive to fluid pressures from the negative torque sensor and the control valve assembly to move between a plurality of positions. An engine control unit or a manual user interface can also be used to control the position of the feather.

20 Claims, 4 Drawing Sheets

(56) References Cited

U.S. PATENT DOCUMENTS

| | | | | |
|---|---|---|---|---|
| 2,943,686 A | * | 7/1960 | Luiz | B64C 11/385 |
| | | | | 416/50 |
| 2,955,658 A | * | 10/1960 | Lombard | B64C 11/40 |
| | | | | 416/36 |
| 2,955,663 A | * | 10/1960 | Brandes | B64C 11/40 |
| | | | | 416/45 |
| 2,957,655 A | * | 10/1960 | Knapp | B64C 11/40 |
| | | | | 244/81 |
| 2,980,188 A | * | 4/1961 | Allen, Jr. | B64C 11/40 |
| | | | | 416/46 |
| 2,986,220 A | * | 5/1961 | Bodem | B64C 11/40 |
| | | | | 416/1 |
| 2,988,153 A | * | 6/1961 | Haworth | B64D 35/00 |
| | | | | 416/43 |
| 3,387,663 A | * | 6/1968 | Barnes | B64C 11/30 |
| | | | | 416/48 |
| 5,037,271 A | | 8/1991 | Duchesneau et al. | |
| 5,042,966 A | | 8/1991 | Schwartz et al. | |
| 5,174,718 A | | 12/1992 | Lampeter et al. | |
| 6,059,528 A | * | 5/2000 | Danielson | B64C 11/303 |
| | | | | 416/153 |
| 8,075,271 B2 | | 12/2011 | Muhlbauer | |
| 9,120,559 B2 | | 9/2015 | Danielson et al. | |
| 10,501,169 B2 | * | 12/2019 | Waddleton | B64C 11/385 |
| 2013/0323050 A1 | | 12/2013 | Kleckler | |
| 2018/0057146 A1 | | 3/2018 | Futa, Jr. et al. | |
| 2018/0072402 A1 | * | 3/2018 | Waddleton | B64C 11/38 |

* cited by examiner

AIRCRAFT TURBOPROP ENGINE PROPELLER PITCH CONTROL SYSTEM INCLUDING A CONTROLLABLE FEATHER VALVE

TECHNICAL FIELD

The present invention generally relates to aircraft turboprop engines, and more particularly relates to a propeller pitch control system for aircraft turboprop engines that includes a controllable feather valve.

BACKGROUND

Some fixed-wing aircraft include one or more propeller blades driven by a gas turbine engine. Such aircraft may include a hydraulically actuated propeller pitch control actuation system that is configured to adjust and maintain a pitch of the propeller blades. Generally, the pitch of the propeller blades corresponds to an amount of thrust generated by the propeller blades.

Historically (e.g., for over fifty years), turboprop engine propeller pitch has been controlled using mechanical flyweight governors during flight, and a mechanical propeller pitch control during ground taxi operations. These mechanical systems routinely include a feather valve, which in conjunction with a negative torque sensing system, can override the commanded propeller pitch to a pitch that does not produce negative torque. An additional function of the feather valve is to allow pilot commanded full feather propeller pitch (propeller blades in line with direction of flight). Full feather of the propeller may be commanded to reduce propeller drag resulting from a failed engine during flight.

Although generally robust, these mechanical systems do exhibit certain drawbacks. For example, these systems typically rely on complex mechanical linkages and require routine maintenance to adjust speed set points. These mechanical systems typically exhibit relatively poor engine speed accuracy, transient overshoots, and pitch angle accuracy in ground taxi operation.

Hence, there is a need for a propeller pitch control system that does not use mechanical flyweight governors, and thus exhibits greater engine speed accuracy, reduces the likelihood for engine speed control transient overshoots, does not rely on relatively complex mechanical linkages, and does not require the same amount of routine maintenance as conventional governors. The present invention addresses at least these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a propeller pitch control system for a turboprop engine of an aircraft includes a negative torque sensor, a full feather control valve assembly, and a feather valve assembly. The negative torque sensor is configured to sense negative torque on a propeller and to supply a negative torque sensor fluid pressure representative of the sensed negative torque. The full feather control valve assembly includes a control valve body and a control valve element. The control valve body includes a drain pressure inlet, a regulated pressure inlet, and a shuttle pressure outlet. The control valve assembly is coupled to receive a valve command and is configured, upon receipt of the valve command, to move the control valve element from a first control valve position, in which the drain pressure inlet is in fluid communication with the shuttle pressure outlet, to a second control valve position, in which the regulated pressure inlet is in fluid communication with the shuttle pressure outlet. The feather valve assembly is in fluid communication with the negative torque sensor and the full feather control valve assembly and includes a feather valve body and a feather valve element. The feather valve body includes a shuttle pressure inlet, a control pressure inlet, a negative torque sensor inlet, a control pressure outlet, and a drain pressure outlet. The shuttle pressure inlet is in fluid communication with the shuttle pressure outlet. The control pressure inlet is in fluid communication with a control pressure fluid source. The negative torque sensor inlet is in fluid communication with the negative torque sensor to receive the negative torque sensor fluid pressure therefrom. The feather valve element is disposed within the feather valve body and is responsive, at least in part, to fluid pressures at the shuttle pressure inlet, the drain pressure outlet, and the negative torque sensor inlet, to move between a first feather valve position, a full-feather valve position, and a plurality of positions between the first feather valve position and the full-feather valve position. In the first feather valve position, the control pressure outlet is in fluid communication with the control pressure inlet and is fluidly isolated from the drain pressure outlet, in the full-feather valve position, the control pressure outlet is in fluid communication with the drain pressure outlet and is fluidly isolated from the control pressure inlet, and in the plurality of positions between the first feather valve position and the full-feather valve position, the control pressure outlet is in fluid communication with the drain pressure outlet and the control pressure inlet.

In another embodiment, a propeller pitch control system for a turboprop engine of an aircraft includes a negative torque sensor, a full feather control valve assembly, an engine control unit, and a feather valve assembly. The negative torque sensor is configured to sense negative torque on a propeller and to supply a negative torque sensor fluid pressure representative of the sensed negative torque. The full feather control valve assembly includes a control valve body and a control valve element. The control valve body includes a drain pressure inlet, a regulated pressure inlet, and a shuttle pressure outlet. The control valve assembly is coupled to receive a valve command and is configured, upon receipt of the valve command, to move the control valve element from a first control valve position, in which the drain pressure inlet is in fluid communication with the shuttle pressure outlet, to a second control valve position, in which the regulated pressure inlet is in fluid communication with the shuttle pressure outlet. The engine control unit is in operable communication with the full feather control valve and is configured to selectively supply the valve command to the full feather control valve. The feather valve assembly is in fluid communication with the negative torque sensor and the full feather control valve assembly and includes a feather valve body and a feather valve element. The feather valve body includes a shuttle pressure inlet, a control pressure inlet, a negative torque sensor inlet, a control pressure outlet, and a drain pressure outlet. The shuttle pressure inlet is in fluid communication with the shuttle pressure outlet. The control pressure inlet is in fluid communication with a control pressure fluid source. The negative torque sensor inlet is in fluid communication with the negative torque sensor to receive the negative torque sensor fluid pressure therefrom. The feather valve element is disposed within the feather valve body and is responsive, at least in part, to fluid pressures at the shuttle pressure inlet, the drain pressure outlet, and the negative torque sensor inlet, to move between a first feather valve position, a full-feather valve position, and a plurality of positions between the first feather valve position and the full-feather valve position. In the first feather valve position, the control pressure outlet is in fluid communication with the control pressure inlet and is fluidly isolated from the drain pressure outlet, in the full-feather valve position, the control pressure outlet is in fluid communication with the drain pressure outlet and is fluidly isolated from the control pressure inlet, and in the plurality of positions between the first feather valve position and the full-feather valve position, the control pressure outlet is in fluid communication with the drain pressure outlet and the control pressure inlet.

In yet another embodiment, a propeller pitch control system for a turboprop engine of an aircraft includes a negative torque sensor, a full feather control valve assembly, a backup torque sensor, an engine control, and a feather valve assembly. The negative torque sensor is configured to sense negative torque on a propeller and to supply a negative torque sensor fluid pressure representative of the sensed negative torque. The full feather control valve assembly includes a control valve body and a control valve element. The control valve body includes a drain pressure inlet, a regulated pressure inlet, and a shuttle pressure outlet. The control valve assembly is coupled to receive a valve command and is configured, upon receipt of the valve command, to move the control valve element from a first control valve position, in which the drain pressure inlet is in fluid communication with the shuttle pressure outlet, to a second control valve position, in which the regulated pressure inlet is in fluid communication with the shuttle pressure outlet. The backup torque sensor is configured to continuously sense propeller torque and supply a sensor signal representative thereof. The engine control unit is in operable communication with the full feather control valve and the backup torque sensor. The engine control unit is configured to determine, based on the sensor signal, when the negative torque sensor is not operating properly and, upon making this determination, to supply the valve command to the full feather control valve. The feather valve assembly is in fluid communication with the negative torque sensor and the full feather control valve assembly and includes a feather valve body and a feather valve element. The feather valve body includes a shuttle pressure inlet, a control pressure inlet, a negative torque sensor inlet, a control pressure outlet, and a drain pressure outlet. The shuttle pressure inlet is in fluid communication with the shuttle pressure outlet. The control pressure inlet is in fluid communication with a control pressure fluid source. The negative torque sensor inlet is in fluid communication with the negative torque sensor to receive the negative torque sensor fluid pressure therefrom. The feather valve element is disposed within the feather valve body and is responsive, at least in part, to fluid pressures at the shuttle pressure inlet, the drain pressure outlet, and the negative torque sensor inlet, to move between a first feather valve position, a full-feather valve position, and a plurality of positions between the first feather valve position and the full-feather valve position.

Furthermore, other desirable features and characteristics of the propeller pitch control system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
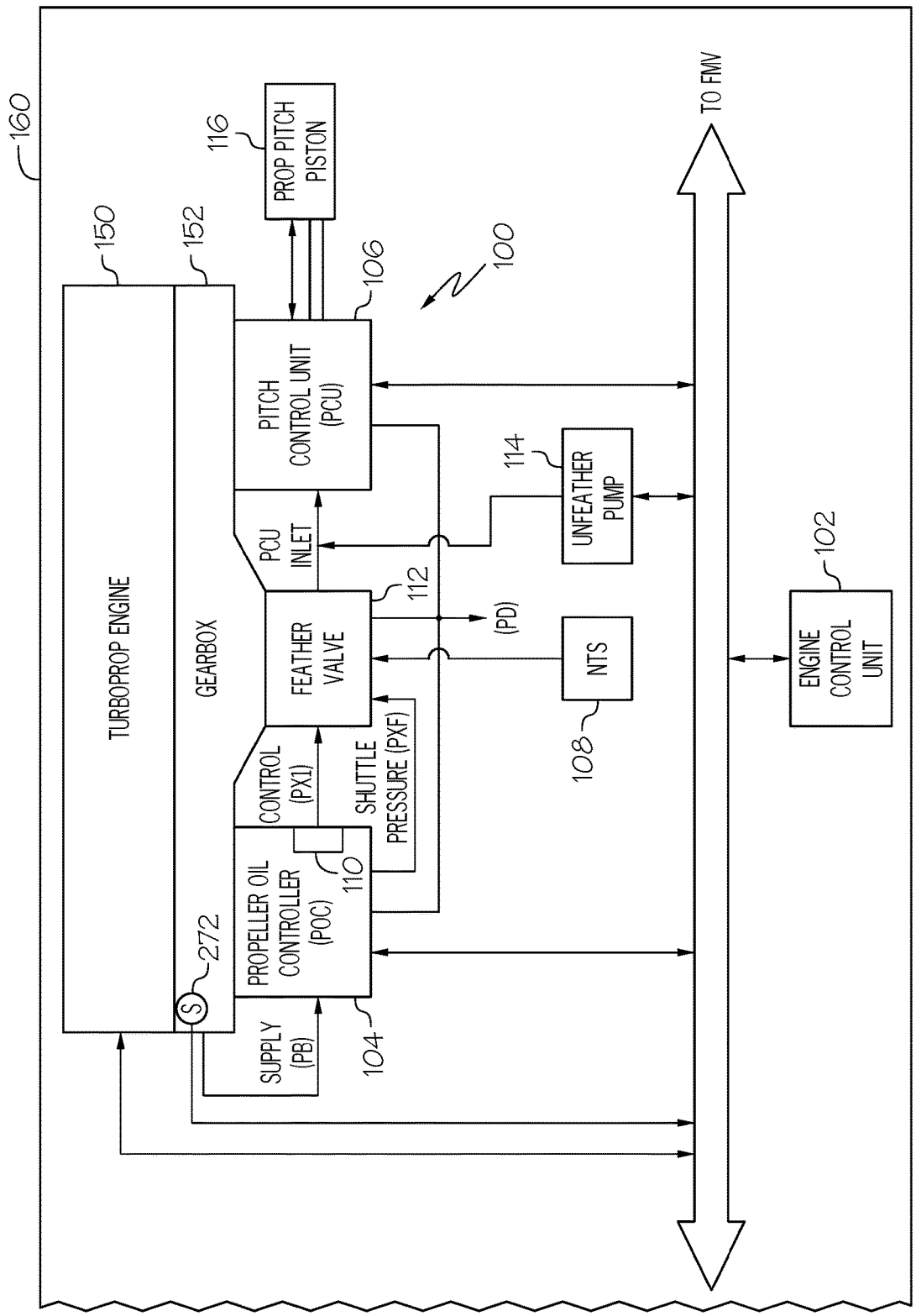
FIG. 1 depicts a functional block diagram of one embodiment of a propeller pitch control system.

Referring first to FIG. 1, a functional block diagram of one embodiment of a turboprop engine propeller pitch control system 100 is depicted. The depicted system 100, which is used in conjunction with a turboprop engine 150 that is mounted on an aircraft 160, includes at least an engine control unit 102, a propeller oil controller 104, a pitch control unit 106, a negative torque sensor 108, and a feather valve assembly 112. As FIG. 1 further depicts, the system 100, or at least portions thereof, may be mounted on or within the gearbox 152 of the turboprop engine 150. The depicted system 100 may also include, at least in some embodiments, an unfeather pump 114.

The engine control unit 102 is in operable communication with the propeller oil controller 104 and the pitch control unit 106, and it is also in operable communication with the turboprop engine 150. The engine control unit 102 may be implemented as any one of numerous types of engine control units such as, for example, an electronic engine controller (EEC) or a full-authority digital engine controller (FADEC). Regardless of how it is specifically implemented, the engine control unit 102 is configured to implement control and monitoring of the turboprop engine 150. In particular, the engine control unit 102 controls fuel flow to the turboprop engine 150, via a non-illustrated fuel metering valve (FMV), to thereby control engine power generation. The engine control unit 102 simultaneously supplies control commands to, and thus controls the operations of, both the propeller oil controller 104 and the pitch control unit 106 to thereby control engine rotational speed.

The propeller oil controller 104 is coupled to receive a supply of oil at a supply pressure (PB) and is configured to discharge the oil at a discharge oil pressure (PX1). The supply of oil may come from any one of numerous sources, but in the depicted embodiment the source is the engine gearbox 152. The propeller oil controller 104 is further coupled to receive control commands from the engine control unit 102 and is configured, in response to the control commands, to control the discharge oil pressure (PX1).

The propeller pitch control unit 106 is coupled to receive the pressurized oil discharged from the propeller oil control unit 104. The propeller pitch control unit 106 is also coupled to receive control commands from the engine control unit 102. The propeller pitch control unit 106 is configured, in response to the control commands it receives, to control the position of a non-illustrated beta piston, which in turn controls the position of a propeller pitch piston 116, and thus propeller blade angle.

The rotational speed and power of the turboprop engine 150 are based, at least in part, on pilot commanded speed and power lever angle (PLA). The engine control unit 102 receives and processes the pilot commanded speed and PLA, together with various additional inputs and, in response to these inputs, generates the commands that control fuel flow, the propeller oil controller 104, and the propeller pitch control unit 106, to produce the requested engine speed and power. Although the various additional inputs may vary, in the depicted embodiments these inputs include, for example fuel metering valve position, engine speed, various pressures, and pitch control unit position.

The engine control unit 102 is also operable to determine a flight phase of the aircraft 160 and is configured to supply the control commands to the propeller oil controller 104 and to the pitch control unit 106 based at least in part on the determined phase of flight. Specifically, when the engine control unit 102 determines the aircraft is conducting specific ground operations, such as pre-takeoff roll taxiing operations or post-landing touchdown operations, the propeller oil controller 104 is commanded by the engine control unit 102 to supply pressurized fluid (e.g., oil) to the pitch control unit 106. The pitch control unit 106 is in turn commanded by the engine control unit 102 to modulate fluid flow to control the position of a propeller pitch piston 116, and thus the propeller blade angle. When the engine control unit 102 determines the aircraft is either conducting a take-off roll or is in flight, the pitch control unit 106 is basically inactive, providing only a minimum propeller pitch stop. However, the propeller oil controller 104 is commanded by the engine control unit 102 to modulate fluid flow to control the position of a propeller pitch piston 116, and thus the propeller blade angle.

The negative torque sensor 108, at least in the depicted embodiment, is a hydro-mechanically controlled valve that is configured to sense negative torque on a propeller and supply a negative torque sensor fluid pressure representative of the sensed negative torque. Should unintended negative torque occur, the negative torque sensor 108, in conjunction with an orifice pack 201 (see FIGS. 2-4), will position the feather valve assembly 112 to block the output pressure of the propeller oil controller 104 (PX1) and reduce the PCU inlet pressure by venting it to drain pressure (PD). As a result, propeller pitch is moved to an increased forward thrust angle, thereby eliminating unintended negative propeller blade torque.

The feather valve assembly 112 is disposed between the propeller oil controller 104 and the pitch control unit 106 and, as just described, can be positioned in response to the negative torque sensor 108. As will be described in more detail further below, the feather valve assembly 112 can also be positioned independently of the negative torque sensor 108, via a pilot-controllable full feather control valve assembly 110, to vent the output pressure of the propeller oil controller 104 (PX1) to drain pressure (PD). This allows the pilot to controllably increase the propeller pitch to a greater forward thrust angle and, if needed, all the way to a feather pitch angle. As is generally known, feather pitch aligns the blade pitch to the direction of flight, so the blade will produce minimal drag if the engine 150 is shut down in flight.

Having described the overall system 100, example embodiments of the full feather control valve assembly 110 and the feather valve assembly 112 and that may be used to implement the turboprop engine propeller pitch control system 100 will now be described. In doing so, reference should now be made to FIG. 2, which depicts a schematic representation of a portion of the turboprop engine propeller pitch control system 100 and that illustrates the full feather control valve assembly 110 and the feather valve assembly 112 in more detail. Before doing so, however, it is noted that FIG. 1 depicts the full feather control valve assembly 110 as being disposed (at least partially) within the propeller oil controller 104. This is merely exemplary of the depicted embodiment, and in other embodiments the full feather control valve assembly 110 may be disposed elsewhere.

The full feather valve control assembly 110 is used, as noted to above, to position the feather valve assembly 112 independently of the negative torque sensor 108. The depicted full feather control valve assembly 110 includes a control valve body 202 and a control valve element 204. The control valve body 202 includes a drain pressure inlet 206, a regulated pressure inlet 208, and a shuttle pressure outlet 212. The full feather control valve assembly 110 is coupled to receive a valve command and is configured, upon receipt of the valve command, to move the control valve element 204 from a first control valve position to a second control valve position. In the first control valve position, which is the position depicted in FIG. 2, the drain pressure inlet 206 is in fluid communication with the shuttle pressure outlet 212. In the second control valve position, which is the position depicted in FIG. 3, the regulated pressure inlet 208 is in fluid communication with the shuttle pressure outlet 212.

The valve command that is selectively supplied to the full feather control valve assembly 110 may be supplied from either the engine control unit 150 or from a user interface 214. The user interface 214 may be implemented as part of another system or device, such as the engine control unit 102, or it may be a stand-alone device. The user interface may take the form of a switch, knob, or other device that may be physically manipulated by an operator, or it may be implemented on a touch screen device. The user interface 214 may also be located, for example, in a cockpit of the aircraft 160.

The full feather control valve assembly 110, at least in the depicted embodiment, additionally includes a control valve bias spring 216 and an actuator 218. The control valve bias spring 216, which is disposed within the actuator 218, applies a spring force to the control valve element 204 that urges the control valve element 204 toward the first control valve position. Although any one of numerous actuators could be used, in the depicted embodiment the actuator 218 is implemented using a solenoid actuator. The solenoid actuator 218 is coupled to the control valve element 204 and is configured to selectively move the control valve element between the first control valve position and the second control valve position. More specifically, the solenoid actuator is coupled to receive the valve command from the engine control unit 150 or the user interface 214 and is configured, upon receipt of the valve command, to overcome the spring force and move the control valve element 204 from the first control valve position to the second control valve position.

The feather valve assembly 112 is in fluid communication with the negative torque sensor 108 and the full feather valve control assembly 110 and includes a feather valve body 222 and a feather valve element 224. The feather valve body 222 includes a shuttle pressure inlet 226, a control pressure inlet 228, a negative torque sensor inlet 232, a control pressure outlet 234, and a drain pressure outlet 236. The shuttle pressure inlet 226 is in fluid communication with the shuttle pressure outlet 212 of the full feather control valve assembly 110, the control pressure inlet 228 is in fluid communication with a control pressure fluid source (PX1), and the negative torque sensor inlet 232 is in fluid communication with the negative torque sensor 108 to receive the negative torque sensor fluid pressure (PNTS) therefrom, The feather valve element 224 is disposed within the feather valve body 222 and is responsive, at least in part, to fluid pressures at the shuttle pressure inlet 226, the drain pressure outlet 236, and the negative torque sensor inlet 232, to move between a first feather valve position, a full-feather valve position, and a plurality of positions between the first feather valve position and the full-feather valve position. In the first feather valve position, which is the position depicted in FIG. 2, the control pressure outlet 234 is in fluid communication with the control pressure inlet 228 and is fluidly isolated from the drain pressure outlet 236. In the full-feather valve position, which is the position depicted in FIG. 3, the control pressure outlet 234 is in fluid communication with the drain pressure outlet 236 and is fluidly isolated from the control pressure inlet 228. As may be appreciated, in many of the plurality of positions between the first feather valve position and the full-feather valve position, the control pressure outlet 234 may be in fluid communication with the drain pressure outlet 236 and the control pressure inlet 228. However, in one position, which is depicted in FIG. 4, the control pressure outlet 234 is fluidly isolated from both the drain pressure outlet 236 and the control pressure inlet 228

Figure 2:
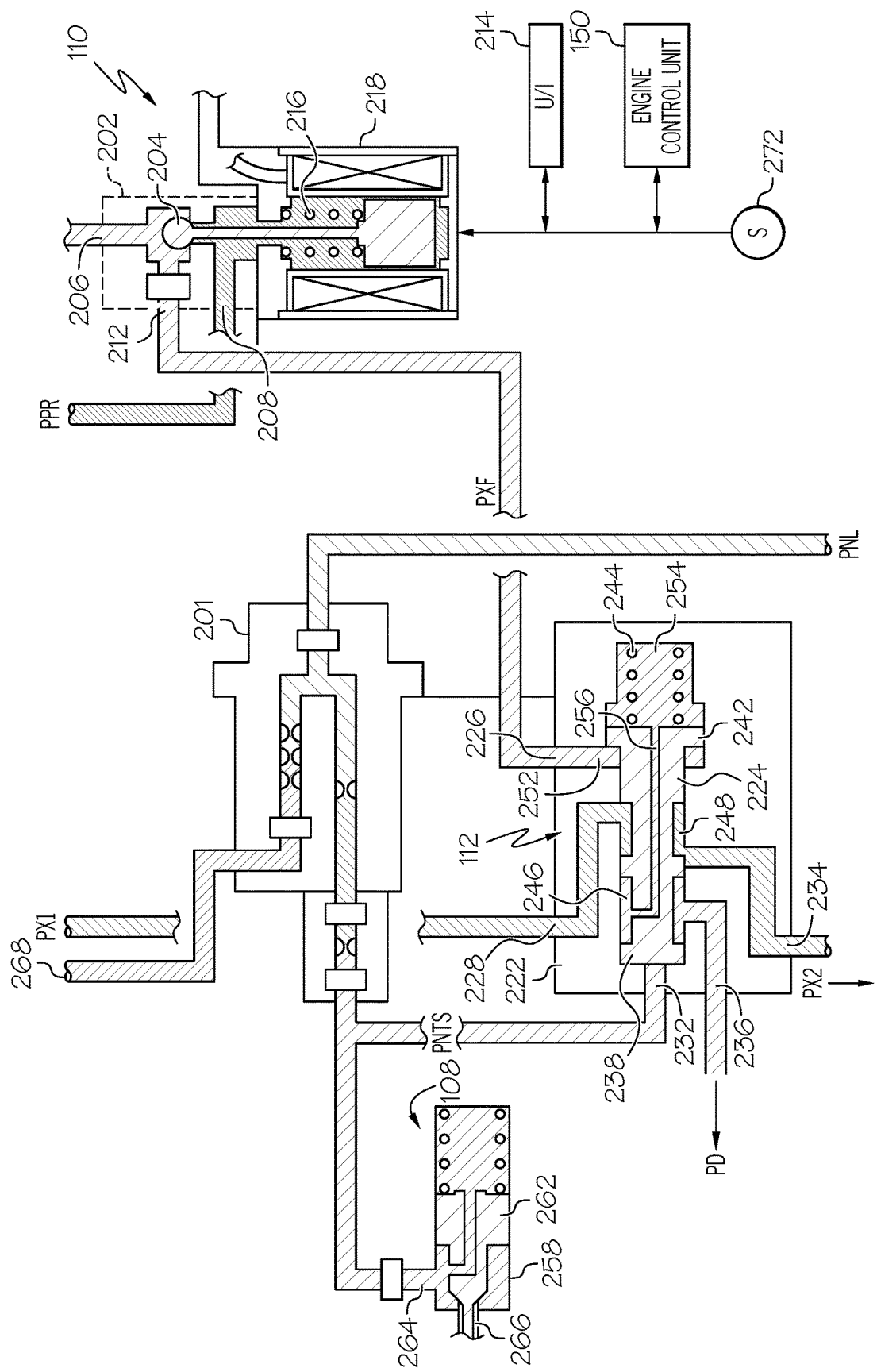
FIGS. 2-4 depict schematic representations of a portion of the propeller pitch control system of FIG. 1, and that illustrate the full feather control valve assembly and the feather valve assembly in more detail.
Figure 3:
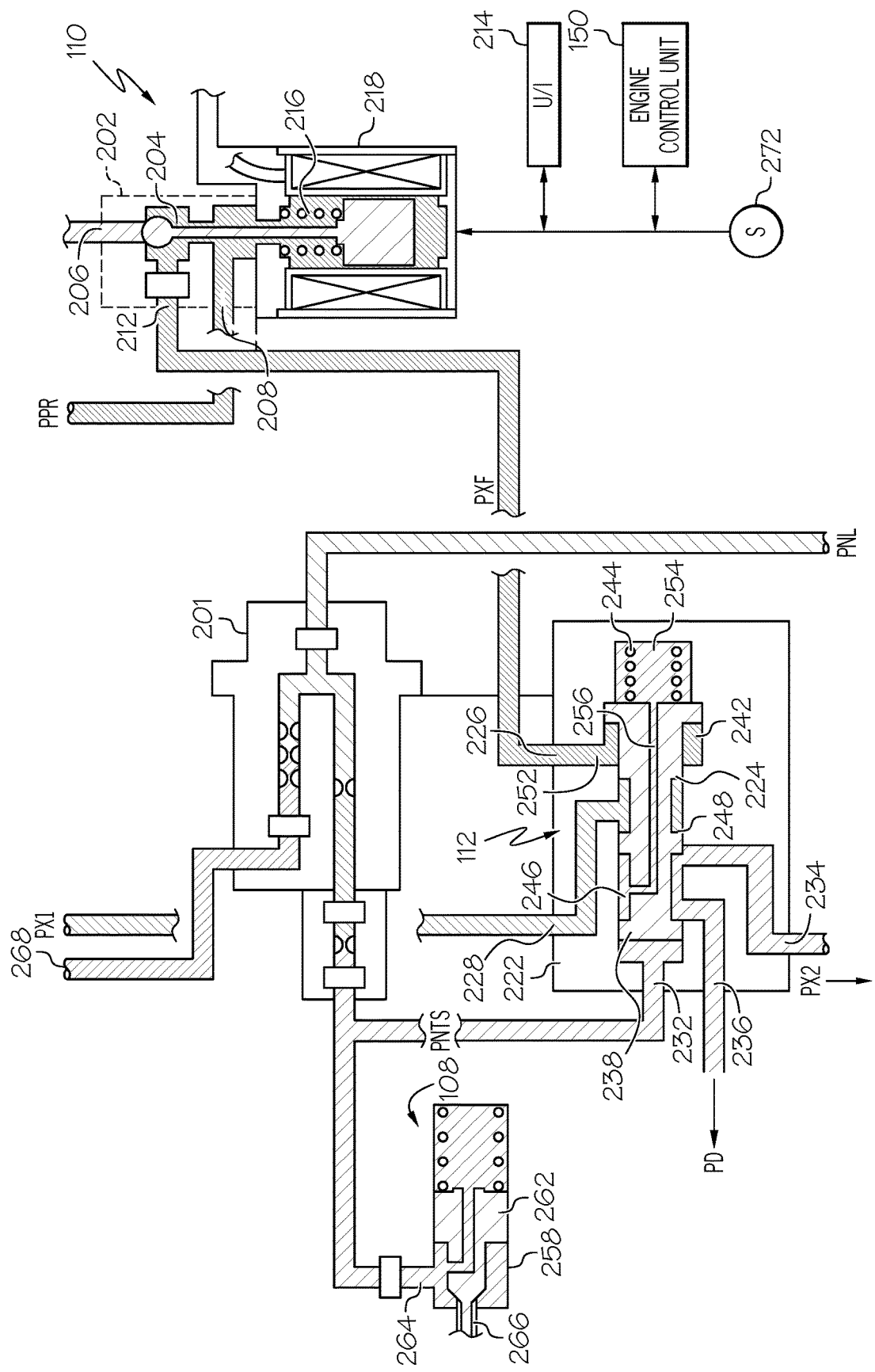
Figure 4:
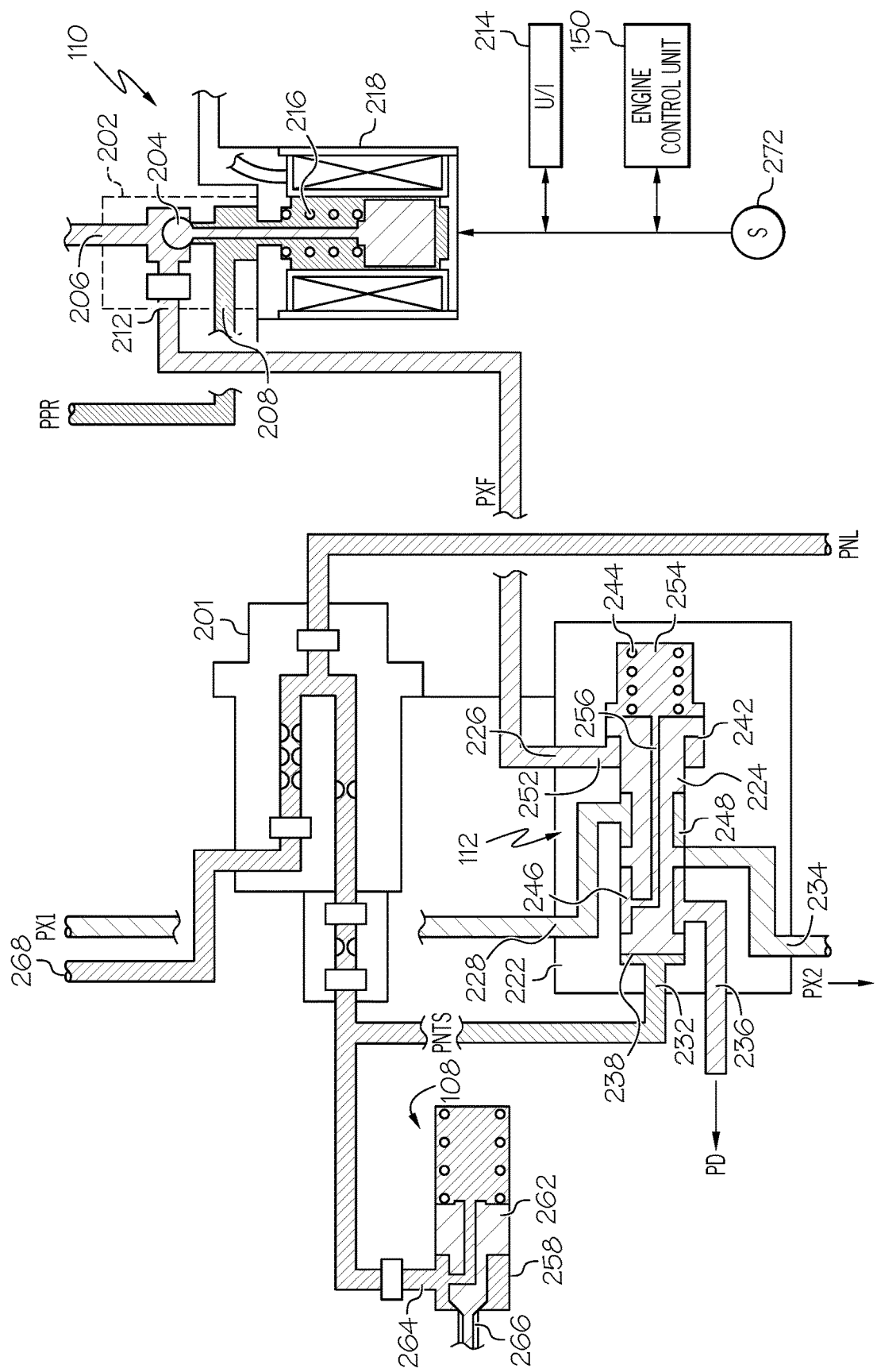

As FIGS. 2 and 3 also depict, the feather valve element 224, at least in the depicted embodiment, is a dual diameter valve element that includes a small diameter end 238 and a large diameter end 242. The small diameter end 238 is in fluid communication with negative torque sensor pressure (PNTS), and the large diameter end 242 is acted on by a load spring 244, which applies a reference force to the feather valve element 224. The feather valve body 222 and the feather valve element 224 further define a drain pressure annulus 246, a regulated pressure annulus 248, a shuttle pressure annulus 252, and a load spring chamber 254. The load spring chamber 254, which has load spring 244 disposed therein, is in fluid communication with the drain pressure annulus 246 via a channel 256 that is formed in the feather valve element 224.

Turning briefly to a description of the negative torque sensor 108, this element includes a sensor valve body 258 and a sensor valve element 262. The sensor valve body 258 has an inlet port 264 and an outlet port 266. The inlet port 264 is in fluid communication with a pressurized fluid source 268 and with the negative torque sensor inlet 232, and the outlet port 266 is in fluid communication with the drain pressure outlet 236.

The sensor valve element 262 is disposed within the sensor valve body 258 and is moveable between an open position and a closed position. In the open position, which is the position depicted in FIGS. 2 and 3, the inlet port 264 is in fluid communication with the outlet port 266. In the closed position, which is the position depicted in FIG. 4, the inlet port 264 is fluidly isolated from the outlet port 266.

If the negative torque sensor 108 senses a negative torque on the propeller of the aircraft 160, the sensor valve element 262 moves toward the closed position, and the fluid pressure (PNTS) increases. As a result, a hydraulic force is exerted on the small diameter end 238 of the feather valve element 224, causing it to move toward the full-feather valve position (FIG. 4). As the feather valve element 224 moves toward that position, it restricts the output pressure of the propeller controller 104 (PX1) and vents the inlet pressure (PX2) supplied to the propeller pitch control unit 106 to drain pressure (PD). Reducing the inlet pressure (PX2) supplied to the propeller pitch control unit 106 causes the propeller pitch to move toward a more aggressive positive pitch, thereby eliminating negative torque on the propeller.

During various unlikely, yet postulated events, such as an engine flameout, the propeller can be commanded to full feather pitch by a pilot of the aircraft 160. This may be accomplished by supplying the valve command from the user interface 214 to the full solenoid actuator 218. As noted above, the solenoid actuator 218 is responsive to the valve command to move the control valve element 204 from the first control valve position to the second control valve position. In the second control valve position, a fluid that is supplied at a regulated fluid pressure magnitude (PPR) is supplied to the shuttle pressure inlet 226. The regulated fluid pressure (PPR) exerts a hydraulic force on the annular region formed between the small diameter end 238 and the large diameter end 242 of the feather valve element 224, causing it to move to the full-feather valve position (FIG. 3). As noted above, in this position the feather valve element 224 restricts the output pressure of the propeller controller 104 (PX1) and vents the inlet pressure (PX2) supplied to the propeller pitch control unit 106 to drain pressure (PD), thereby moving the propeller to full feather pitch.

Another unlikely, yet postulated event, is failure of the propeller oil controller 104. It should be noted that the propeller oil controller 104 is preferably configured such that, in the unlikely event of a failure, the output pressure of the propeller oil controller 104 (PX1) is set to the regulated fluid pressure magnitude (PPR). If this occurs in flight, the system 100 may be configured to limit propeller pitch to no less than flight idle positive pitch. This position, however, may not be sufficient to sustain level flight. With the configuration described herein, the engine control unit 150 is further configured, upon determining that the propeller oil controller 104 is inoperable, to supply commands to the solenoid actuator 218 to control propeller pitch, and thus engine power. As a backup to (or instead of) the engine control unit 150, the pilot can intermittently cycle the solenoid actuator 218, via the user interface 214, to controllably drive the propeller from a flight idle propeller pitch, toward a full feather pitch, to an intermediate positive pitch that is aggressive enough to sustain level flight.

Still another unlikely, yet postulated event, is a failure of the negative torque sensor 108. For example, it is postulated that the negative torque sensor 108 could stick when it senses a negative torque on the propeller. To address this postulated failure, the system 100 additionally includes a backup torque sensor 272, which may be disposed in the gearbox 152, to continuously sense propeller torque (both positive and negative) and supply a sensor signal to the engine control unit 150. If the engine control unit 150 determines, based on the sensor signal from the backup torque sensor, that negative torque is not being corrected by the negative torque sensor 108, the engine control unit 150 will supply commands to the solenoid actuator 218 to reduce the negative torque.

The propeller pitch control system described herein allows for a propeller pitch control system that does not rely on complex mechanical linkages, reduces in-service maintenance, provides additional means to accommodate postulated propeller control system failures, and can be automatically functionally checked by during every engine start, which improves reliability and safety.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A propeller pitch control system for a turboprop engine of an aircraft, comprising:
   a negative torque sensor configured to sense negative torque on a propeller and supply a negative torque sensor fluid pressure representative of the sensed negative torque;
   a full feather control valve assembly comprising a control valve body and a control valve element, the control valve body including a drain pressure inlet, a regulated pressure inlet, and a shuttle pressure outlet, the control valve assembly coupled to receive a valve command and configured, upon receipt of the valve command, to move the control valve element from a first control valve position, in which the drain pressure inlet is in fluid communication with the shuttle pressure outlet, to a second control valve position, in which the regulated pressure inlet is in fluid communication with the shuttle pressure outlet; and
   a feather valve assembly in fluid communication with the negative torque sensor and the full feather control valve assembly, the feather valve comprising:
      a feather valve body including a shuttle pressure inlet, a control pressure inlet, a negative torque sensor inlet, a control pressure outlet, and a drain pressure outlet, the shuttle pressure inlet in fluid communication with the shuttle pressure outlet, the control pressure inlet in fluid communication with a control pressure fluid source, the negative torque sensor inlet in fluid communication with the negative torque sensor to receive the negative torque sensor fluid pressure therefrom, and
      a feather valve element disposed within the feather valve body and responsive, at least in part, to fluid pressures at the shuttle pressure inlet, the drain pressure outlet, and the negative torque sensor inlet, to move between a first feather valve position, a full-feather valve position, and a plurality of positions between the first feather valve position and the full-feather valve position,
   wherein:
      in the first feather valve position, the control pressure outlet is in fluid communication with the control pressure inlet and is fluidly isolated from the drain pressure outlet,
      in the full-feather valve position, the control pressure outlet is in fluid communication with the drain pressure outlet and is fluidly isolated from the control pressure inlet, and
      in the plurality of positions between the first feather valve position and the full-feather valve position, the control pressure outlet is in fluid communication with the drain pressure outlet and the control pressure inlet.

2. The propeller pitch control system of claim 1, further comprising:
   a load spring that applies a reference force to one end of a feather valve element.

3. The propeller pitch control system of claim 2, wherein the feather valve element is a dual diameter valve element including a small diameter end and a large diameter end, the small diameter end in fluid communication with negative torque sensor pressure, the large diameter end acted on by the load spring.

4. The propeller pitch control system of claim 3, wherein:
   the feather valve body and the feather valve element further define a drain pressure annulus, a regulated pressure annulus, a shuttle pressure annulus, and a load spring chamber;
   the load spring is disposed within the load spring chamber; and
   the load spring chamber is in fluid communication with the drain pressure annulus via a channel formed in the feather valve element.

5. The propeller pitch control system of claim 1, further comprising:
   a solenoid actuator coupled to the control valve element, the solenoid actuator coupled to receive the valve command and configured, in response thereto, to selectively move the control valve element between the first control valve position and the second control valve position; and
   a control valve bias spring that applies a spring force to the control valve element that urges the control valve element toward the first control valve position.

6. The propeller pitch control system of claim 5, further comprising:
   an engine control unit in operable communication with the solenoid actuator and configured to selectively supply the valve command thereto.

7. The propeller pitch control system of claim 6, further comprising:
a backup torque sensor operable to continuously sense propeller torque and supply a sensor signal representative thereof to the engine control unit,
wherein the engine control unit is responsive to the sensor signal to selectively supply the valve command the solenoid actuator.

8. The propeller pitch control system of claim 6, wherein the solenoid actuator is coupled to receive the valve command and is configured, upon receipt of the valve command, to overcome the spring force and move the control valve element from the first control valve position to the second control valve position.

9. The propeller pitch control system of claim 1, wherein the negative torque sensor comprises:
a sensor valve body having an inlet port and an outlet port, the inlet port in fluid communication with a pressurized fluid source and with the negative torque sensor inlet, the outlet port in fluid communication with the drain pressure outlet; and
a sensor valve element disposed within the sensor valve body, the sensor valve element moveable between an open position, in which the inlet port is in fluid communication with the outlet port, and a closed position, in the inlet port is fluidly isolated from the outlet port.

10. A propeller pitch control system for a turboprop engine of an aircraft, comprising:
a negative torque sensor configured to sense negative torque on a propeller and supply a negative torque sensor fluid pressure representative of the sensed negative torque;
a full feather control valve assembly comprising a control valve body and a control valve element, the control valve body including a drain pressure inlet, a regulated pressure inlet, and a shuttle pressure outlet, the control valve assembly coupled to receive a valve command and configured, upon receipt of the valve command, to move the control valve element from a first control valve position, in which the drain pressure inlet is in fluid communication with the shuttle pressure outlet, to a second control valve position, in which the regulated pressure inlet is in fluid communication with the shuttle pressure outlet;
an engine control unit in operable communication with the full feather control valve, the engine control unit configured to selectively supply the valve command to the full feather control valve; and
a feather valve assembly in fluid communication with the negative torque sensor and the full feather control valve assembly, the feather valve assembly comprising:
a feather valve body including a shuttle pressure inlet, a control pressure inlet, a negative torque sensor inlet, a control pressure outlet, and a drain pressure outlet, the shuttle pressure inlet in fluid communication with the shuttle pressure outlet, the control pressure inlet in fluid communication with a control pressure fluid source, the negative torque sensor inlet in fluid communication with the negative torque sensor to receive the negative torque sensor fluid pressure therefrom, and
a feather valve element disposed within the feather valve body and responsive, at least in part, to fluid pressures at the shuttle pressure inlet, the drain pressure outlet, and the negative torque sensor inlet, to move between a first feather valve position, a full-feather valve position, and a plurality of positions between the first feather valve position and the full-feather valve position,
wherein:
in the first feather valve position, the control pressure outlet is in fluid communication with the control pressure inlet and is fluidly isolated from the drain pressure outlet,
in the full-feather valve position, the control pressure outlet is in fluid communication with the drain pressure outlet and is fluidly isolated from the control pressure inlet, and
in the plurality of positions between the first feather valve position and the full-feather valve position, the control pressure outlet is in fluid communication with the drain pressure outlet and the control pressure inlet.

11. The propeller pitch control system of claim 10, further comprising:
a load spring that applies a reference force to one end of a feather valve element.

12. The propeller pitch control system of claim 11, wherein the feather valve element is a dual diameter valve element including a small diameter end and a large diameter end, the small diameter end in fluid communication with negative torque sensor pressure, the large diameter end acted on by the load spring.

13. The propeller pitch control system of claim 12, wherein:
the feather valve body and the feather valve element further define a drain pressure annulus, a regulated pressure annulus, a shuttle pressure annulus, and a load spring chamber;
the load spring is disposed within the load spring chamber; and
the load spring chamber is in fluid communication with the drain pressure annulus via a channel formed in the feather valve element.

14. The propeller pitch control system of claim 10, further comprising:
a solenoid actuator coupled to the control valve element and in operable communication with the engine control unit, the solenoid actuator responsive to commands received from the engine control unit to move the control valve element between the first and second control valve positions.

15. The propeller pitch control system of claim 14, further comprising:
a control valve bias spring that applies a spring force to the control valve element that urges the control valve element toward the first control valve position.

16. The propeller pitch control system of claim 15, wherein the solenoid actuator is coupled to receive the valve command and is configured, upon receipt of the valve command, to overcome the spring force and move the control valve element from the first control valve position to the second control valve position.

17. The propeller pitch control system of claim 10, further comprising:
a user interface in operable communication with the full feather control valve, the user interface configured to receive input from a user and operable, in response to the input, to selectively supply the valve command to the full feather control valve.

18. The propeller pitch control system of claim 9, wherein the negative torque sensor comprises:
a sensor valve body having an inlet port and an outlet port, the inlet port in fluid communication with a pressurized fluid source and with the negative torque sensor inlet, the outlet port in fluid communication with the drain pressure outlet; and a sensor valve element disposed within the sensor valve body, the sensor valve element moveable between an open position, in which the inlet port is in fluid communication with the outlet port, and a closed position, in the inlet port is fluidly isolated from the outlet port.

19. A propeller pitch control system for a turboprop engine of an aircraft, comprising:
   a negative torque sensor configured to sense negative torque on a propeller and supply a negative torque sensor fluid pressure representative of the sensed negative torque;
   a full feather control valve assembly comprising a control valve body and a control valve element, the control valve body including a drain pressure inlet, a regulated pressure inlet, and a shuttle pressure outlet, the control valve assembly coupled to receive a valve command and configured, upon receipt of the valve command, to move the control valve element from a first control valve position, in which the drain pressure inlet is in fluid communication with the shuttle pressure outlet, to a second control valve position, in which the regulated pressure inlet is in fluid communication with the shuttle pressure outlet;
   a backup torque sensor configured to continuously sense propeller torque and supply a sensor signal representative thereof;
   an engine control unit in operable communication with the full feather control valve and the backup torque sensor, the engine control unit configured to determine, based on the sensor signal, when the negative torque sensor is not operating properly and, upon making this determination, to supply the valve command to the full feather control valve; and
   a feather valve assembly in fluid communication with the negative torque sensor and the full feather control valve assembly, the feather valve comprising:
      a feather valve body including a shuttle pressure inlet, a control pressure inlet, a negative torque sensor inlet, a control pressure outlet, and a drain pressure outlet, the shuttle pressure inlet in fluid communication with the shuttle pressure outlet, the control pressure inlet in fluid communication with a control pressure fluid source, the negative torque sensor inlet in fluid communication with the negative torque sensor to receive the negative torque sensor fluid pressure therefrom, and
      a feather valve element disposed within the feather valve body and responsive, at least in part, to fluid pressures at the shuttle pressure inlet, the drain pressure outlet, and the negative torque sensor inlet, to move between a first feather valve position, a full-feather valve position, and a plurality of positions between the first feather valve position and the full-feather valve position.

20. The propeller pitch control system of claim 19, wherein:
   in the first feather valve position, the control pressure outlet is in fluid communication with the control pressure inlet and is fluidly isolated from the drain pressure outlet;
   in the full-feather valve position, the control pressure outlet is in fluid communication with the drain pressure outlet and is fluidly isolated from the control pressure inlet; and
   in the plurality of positions between the first feather valve position and the full-feather valve position, the control pressure outlet is in fluid communication with the drain pressure outlet and the control pressure inlet.

* * * * *